United States Patent [19]

Uchino et al.

[11] Patent Number: 4,553,329

[45] Date of Patent: Nov. 19, 1985

[54] DIAL INDICATION TYPE MEASURING INSTRUMENT

[75] Inventors: Kenju Uchino; Tomoo Sakai, both of Utsunomiya, Japan

[73] Assignee: Mitutoyo Mfg. Co., Ltd., Tokyo, Japan

[21] Appl. No.: 573,781

[22] Filed: Jan. 25, 1984

[30] Foreign Application Priority Data

Feb. 9, 1983 [JP] Japan ................................. 58-20420

[51] Int. Cl.⁴ .......................... G01B 3/20; G01B 5/02
[52] U.S. Cl. ................................................. 33/147 T
[58] Field of Search ............. 33/147 T, 147 J, 147 N, 33/147 R, 172 C, 143 J, 143 K, 143 M, 125 R, 125 M

[56] References Cited

U.S. PATENT DOCUMENTS 4,106,204  8/1978  Schader ........................ 33/147 T

FOREIGN PATENT DOCUMENTS 63052   6/1892  Fed. Rep. of Germany ... 33/147 X
866253  2/1953  Fed. Rep. of Germany ... 33/125 M Primary Examiner—Harry N. Haroian
Attorney, Agent, or Firm—Flynn, Thiel, Boutell & Tanis

[57] ABSTRACT

The present invention relates to a dial indication type measuring instrument in which a shift in position of a needle can be easily corrected.

A driving pinion for driving the needle is biased by a spring provided on a dial indicating portion to be normally meshingly engaged with a rack provided in a main scale. Movably inserted through and held in a slider is a releasing pin, the forward end of which is engaged with said driving pinion. When this releasing pin is pushed in or pulled out, the driving pinion can be released from the rack against the biasing force of the spring, and, when the slider is moved in the above-described state, a shift in position of the needle can be corrected.

16 Claims, 5 Drawing Figures

DIAL INDICATION TYPE MEASURING INSTRUMENT

BACKGROUND OF THE INVENTION

1. Field of the Invention

This invention relates to a dial indication type measuring instrument, and more particularly to a mechanism for correcting a shift of a needle.

2. Description of the Prior Art

There have heretofore been known dial indication type measuring instruments such as dial indication type slide calipers and a dial indication type depth gauge, in both of which, a needle in a dial indicating portion is driven by a rack and a pinion, whereby a measured value is indicated by the needle. In the dial indication type measuring instrument described above, a measured value is easily readable and the high precision measurement is facilitated as compared with the construction of slide calipers in which a measured value must be read from both graduations of a main scale and an auxiliary scale for example, whereby the dial indication type measuring instrument has been used widely.

Now, to meet the requirements for higher accuracy in measured values and for compactness in size of the measuring instrument as a whole, the measuring instrument of the type described should have a rack and a pinion, which are very delicately finished. For example, in the dial indication type slide calipers having the minimum graduation of 0.01 mm of a dial plate, the module is determined to be 0.1-0.2 thereof, and moreover, the rack and the pinion are in mesh without a play. Because of this, if any foreign matter or the like intrudes a space formed between the rack and the pinion and adheres thereto, then, when the pinion is getting over the foreign matter or the like, a shift in position tends to occur in the meshing engagement between the rack and the pinion, thus resulting in a shifted zero position of a needle in a dial indicating portion.

In the above-described case, heretofore, such a correcting method has been taken that a thin sheet is inserted between the rack and the pinion, whereby the slider is caused to move in a state where the pinion is floating up from the rack and so forth, so that the shift in position of the needle can be corrected. However, the following disadvantage has been presented by this correcting method using the thin sheet. More specifically, even if the forward end of the thin sheet is pushed into the space formed between the rack and the pinion, the thin sheet cannot be snugly inserted into the space in many cases. If the thin sheet is forcedly pushed into the space, then the pinion or the like tends to be damaged. Furthermore, it is not desirable that the direct contact of the thin sheet with the rack and the pinion, which have been finished with high accuracy. Moreover, when the thin sheet is inserted into or withdrawn from, the pinion tends to be rotated, it has been difficult that the position of meshing engagement between the rack and the pinion is corrected in a manner as desired. Further, since it has been very difficult to move the slider for a large distance while the thin sheet is inserted into the space between the rack and the pinion, the slider can hardly be moved after the insertion of the thin sheet. In consequence, the slider has been stopped by visual observation at an intermediate position where an end place such for example as 2.00 mm or 5.00 mm of the main scale graduation becomes zero, not at the true zero position where a main scale jaw is brought into contact with a slider jaw, and at this time, the needle in the dial indicating a portion is set at zero and so on. Therefore, in view of this fact, it has been difficult to achieve a correct zero adjustment of the needle, and, in some cases, the dial plate in the dial indicating portion should be rotatably adjusted even after the shift in position of the needle has been corrected. Furthermore, it has been normal to provide the rack in a groove formed in the main scale, and, in order to insert the thin sheet into the space between the rack and the pinion, the groove should be made large and long beyond necessity, whereby the labor for finishing is increased, thus presenting a possibility of decreasing the mechanical strength of the main scale.

SUMMARY OF THE INVENTION

The present invention has as its object the provision of a dial indication type measuring instrument, in which a shift in position of a needle can be readily and accurately corrected.

To achieve the above-described object, the present invention contemplates that, in a dial indication type measuring instrument, the measuring instrument comprises: a main body provided therein with a rack; a slider having a dial indicating portion and movably supported on the main body; biasing means for biasing a driving pinion for driving a needle in the dial indicating portion toward the rack to bring the driving pinion into meshing engagement with the rack; and releasing means for releasing the driving pinion from the rack against the biasing force of the biasing means and having a control end being disposed outwardly of the slider; and, in correcting a shift in position of the needle, the biasing of the driving pinion toward the rack due to the biasing force of the biasing means is released by the releasing means disposed outwardly of the slider, to thereby release the driving pinion from the rack.

DETAILED DESCRIPTION OF THE PREFERRED EMBODIMENT

Description will hereunder be given of the embodiments of the present invention with reference to the drawings.

Figure 1:
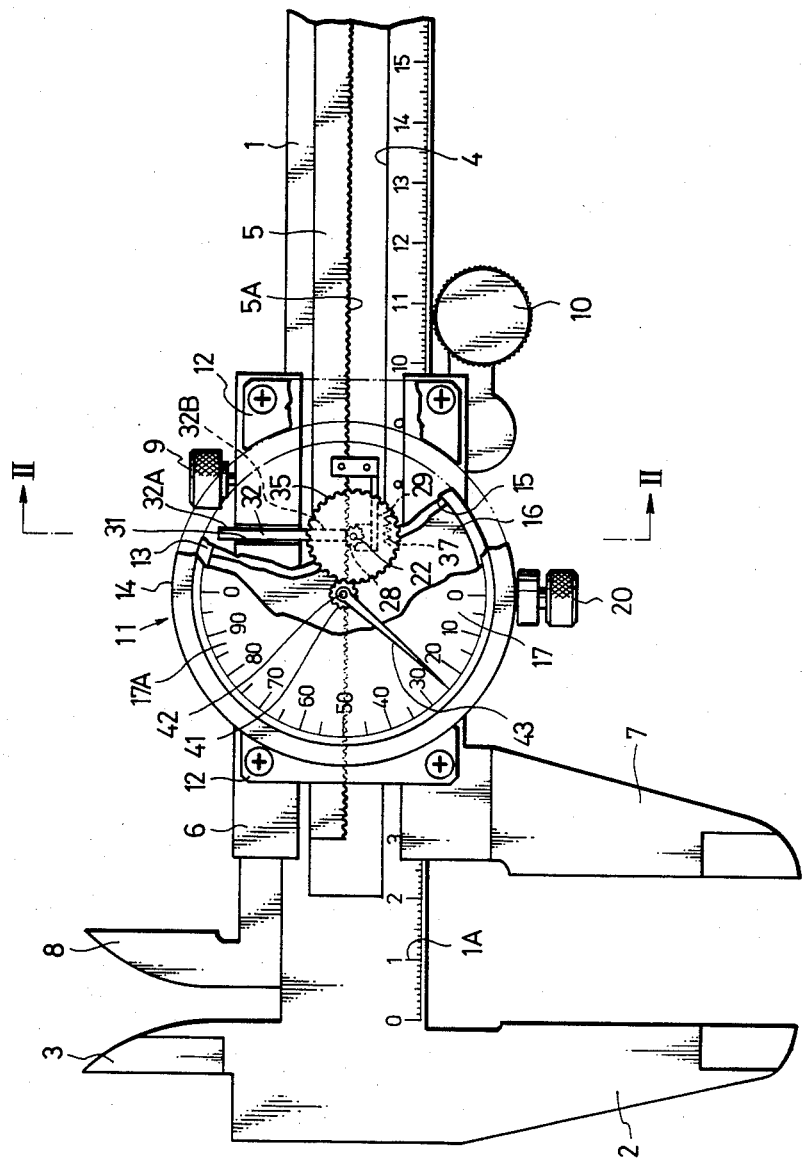
FIG. 1 is a partially cutaway front view showing a first embodiment, in which the dial indication type measuring instrument according to the present invention is applied to dial indication type slide calipers.

FIG. 1 shows the first embodiment, in which the dial indication type measuring instrument according to the present invention is applied to dial indication type slide calipers. In the drawing, a main scale 1 as being a main body is formed into a substantially rectangular shape in section, and provided at one end in the longitudinal direction thereof with a jaw 2 for the external measuring and a jaw 3 for the internal measuring. Furthermore, the main scale 1 is provided at the front side thereof with a main scale graduation 1A and formed also at the front side thereof with a groove 4 within a predetermined range in the longitudinal direction thereof. Solidly secured to this groove 4 is a rack member 5 being of a flat bar having a rectangular section. A rack 5A formed at a side edge of this rack member 5 is disposed at the substantially central portion of the groove 4 for example.

A slider 6 being of a substantially square shaped C in cross-section is movably coupled to and supported by the main scale 1 with the C-shaped opening thereof being positioned above the groove 4. This slider 6 is provided at one end thereof with a jaw 7 for the external measuring and a jaw 8 for the internal measuring. Further, the slider 6 is provided at one side edge thereof with a clamping screw 9 for suitably clamping the slider to the main scale 1 and at the other side edge with a constant-pressure feed wheel 10.

A dial indicating portion 11 is fixed to the front surface of the slider 6 through a fixing piece 12 and the like. This dial indicating portion 11 has an inner frame 13 and an outer frame 14, both of which are ring-shaped and coupled to each other. Fixed to the inner frame 13 are a rear cover 15 being in contact with the slider 6 and a base plate 16 spaced a predetermined distance apart from the rear cover 15. On the other hand, fixed to the outer frame 14 is a dial plate 17 and a transparent cover, not shown. Furthermore, the outer frame 14 is provided with an outer frame clamping screw 20 for clamping the outer frame 14 to the inner frame 13.

Figure 2:
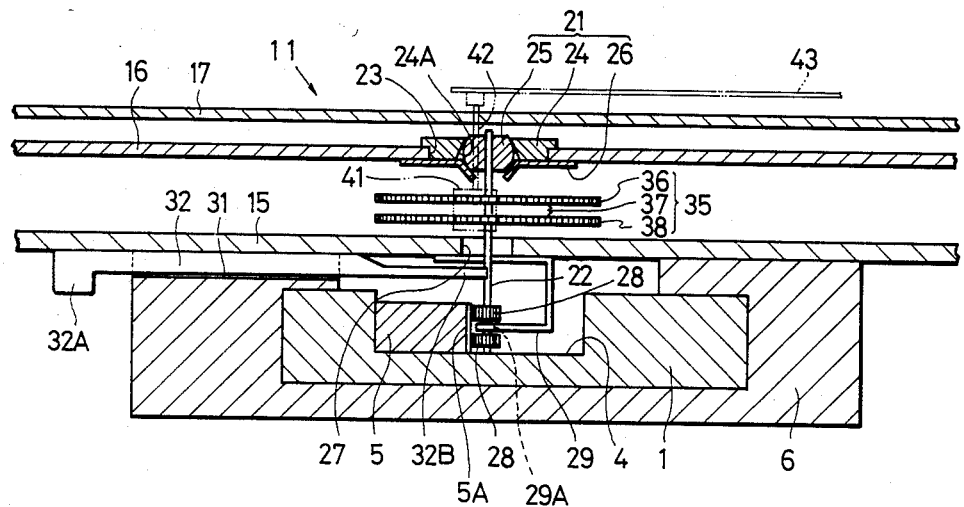
FIG. 2 is an enlarged sectional view taken along the line II—II in FIG. 1.

As shown in FIG. 2, a rotary shaft 22 is rotatably and tiltably mounted at a predetermined portion of the base plate 16 through a tiltable bearing 21. This tiltable bearing 21 comprises: a bearing member 24 coupled into and fixed to a bearing hole formed in the base plate 16 and having a tapered surface 24A being increased in diameter toward the bottom end thereof in the drawing; a substantially spherical tiltable body 25 inserted into the tapered surface 24A of the bearing member 24 and having a spherical outer peripheral surface; and a spring member 26 for urging the tiltable body 25 against the tapered surface 24A. The top end portion of the rotary shaft 22 is rotatably coupled into and held by the tiltable body.

Figure 3:
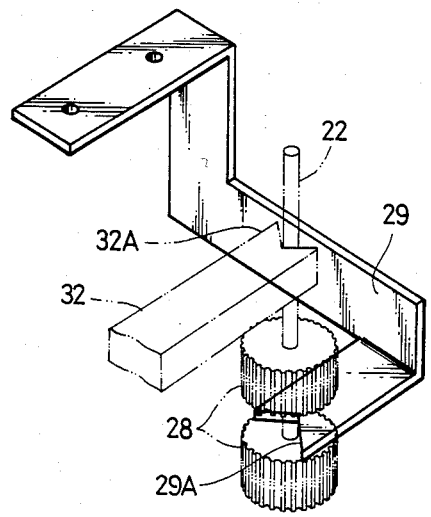
FIG. 3 is an enlarged perspective view showing the arrangement of the cantilever spring in the above embodiment.

The bottom end portion of the rotary shaft 22 is loosely coupled through an insertion hole 27, and extended into the groove 4. Fixed to the bottom end portion of the rotary shaft 22 in the groove 4 are two driving pinions 28 at a predetermined interval. These two driving pinions 28 are biased toward the rack 5A by a cantilever spring 29 as being the biasing means, whereby the driving pinions 28 and the rack 5A are brought into meshing engagement through the resiliency of the cantilever spring 29. The cantilever spring 29 is formed into a sheet spring, having a fixed end thereof being fixed to the bottom end face (the outer peripheral surface) of the rear cover 15 and a free end thereof provided therein with a V-shaped cutaway portion 29A (Refer to FIG. 3). One side surface of the rotary shaft 22 is brought into abutting contact with the interior of the cutaway portion 29A. In other words, the free end is engaged with the rotary shaft 22 in a manner to abut the rotary shaft 22 against the rack 5A.

Furthermore, a guide groove 31 opening on the side of the top end face of the slider 6 is formed at a predetermined position of the slider 6 in the vertical direction in FIG. 1. A releasing pin 32 as being releasing means is held in the guide groove 31 in a manner to be movable in the direction of the groove 31. One end of this releasing pin 32 is formed into a control end 32A, which is disposed outwardly of the slider 6. Due to the operation of this control end 32A, the releasing pin 32 is linearly movable in the lateral direction in FIG. 2, being guided by the guide groove 31. Furthermore, the other end of the releasing pin 32 is formed into an engageable end 32B, which can abut against the rotary shaft 22. When the control end 32A is pushed in to the right in FIG. 2, the engageable end 32B abuts against the rotary shaft 22, whereby the rotary shaft 22 is tilted about the tiltable bearing in the counterclockwise direction in the drawing, whereby the driving pinion 28 is moved in a direction opposite to the rack 5A against the biasing force of the cantilever spring 29, so that the driving pinion 28 can be released from the rack 5A.

An enlarging gear assembly 35 is mounted onto the rotary shaft 22. This enlarging gear assembly 35 comprises a fixed gear 36 of a large diameter fixed to the rotary shaft 22 and a backlash preventive gear 38 having a configuration identical with that of the fixed gear 36 and connected to the fixed gear 36 through a tensile spring 37 in a manner to be rotatable relative to the fixed gear 36. A center pinion 41 is brought into meshing engagement with this enlarging gear assembly 35. The center pinion 41 is fixed to a center pinion shaft 42 disposed at the center of the dial plate 17. A needle 43 indicating a graduated portion 17A on the dial plate 17 is fixed to the forward end of this center pinion shaft 42, and, as the slider 6 moves on the main scale 1, a movement value of the slider is enlargedly transmitted to the needle 43 through the rack 5A, the driving pinion 28, the enlarging gear assembly 35 and the center pinion 41.

Description will hereunder be given of operation of correcting a shift in position of the needle 43 in this embodiment.

It is assumed that the needle 43 of the dial indicating portion 11 has been shifted in its position.

Now, the slider 6 is moved, so that the needle 43 of the dial indicating portion 11 can indicate the zero point of the graduated portion 17A. The slider 6 is temporarily stopped at this position. Subsequently, the control end 32A of the releasing pin 32 is pushed in, whereby the driving pinion 28 is released from the rack 5A against the biasing force of the cantilever spring 29. Thereafter, the slider 6 is moved with the above-described released state being maintained, whereby the jaw 2 for the external measuring of the main scale 1 comes into contact with the jaw 7 for the external measuring of the slider 6, so that the registration between the slider 6 and the main scale 1 can be made. During this, non-engagement between the rack 5A and the driving pinion 28 continues, thereby not allowing the needle 43 to move away from the zero position. Upon completion of the registration between the slider 6 and the main scale 1 as described above, if the push-in of the control end 32A is released, then the releasing pin 32 is pushed back by the biasing force of the cantilever spring 29, whereby the rack 5A and the driving pinion 28 are brought into meshing engagement again, so that the correction of the shift in position of the needle 43 can be completed. Upon completion of the correction, the releasing pin 32 may be withdrawn from the slider 6.

The above-described embodiment can offer the following advantages.

Only the push-in operation of the control end 32A of the releasing pin 32 can release the driving pinion 28 from the rack 5A. In consequence, differing from the example of the prior art where the forward end of the thin sheet is inserted into the space between the rack and the pinion and the pinion is put on the top of the thin sheet to thereby release the engagement between the rack and the pinion, no skill is required for releasing the driving pinion 28 from the rack 5A readily and reliably. Moreover, heretofore, the thin sheet has been brought into direct contact with the rack, pinion and the like and tends to damage these rack, pinion and the like. However, in this embodiment, the engageable end 32B comes into contact with only the rotary shaft 22 and does not come into contact with the rack 5A and the driving pinion 28. In consequence, there is no possibility that the rack 5A and the driving pinion 28 are damaged.

Furthermore, when the thin sheet is inserted or withdrawn, a rotational force has been applied to the pinion from the thin sheet, whereby the needle has been rotated, thus presenting the problem that it is difficult to correct the position of the needle accurately. However, in this embodiment, no force to rotate the driving pinion 28 is required for releasing the driving pinion 28 from the rack 5A. In consequence, as viewed from this point, this embodiment is advantageous in that a shift in position of the needle 43 can be readily corrected, and moreover, a highly accurate correction can be effected. Further, since the slider 6 can be moved for a large distance in the state where the releasing pin 32 is pushed in to release the driving pinion 28 from the rack 5A, the zero position of the needle 43 can be corrected at the position of the slider 6 where the jaws 2 and 7 are brought into contact with each other, i.e., at the zero position of the main scale graduation 1A. In consequence, as viewed from this point also, the needle 43 can be accurately corrected, and hence, there is no need to adjust the dial plate 17 after the temporary adjustment.

Furthermore, in the example of the prior art in which the thin sheet has been used, the thin sheet cannot be inserted into the space between the pinion and the rack unless the groove 4 is made long and large beyond necessity. In this embodiment, there is no need to make the groove 4 long and large and the main scale 1 is not reduced in the mechanical strength thereof.

Description will hereunder be given of the embodiments other than the above. Same reference numerals are used to designate same or similar parts as in the above embodiment, so that the description will be omitted or simplified.

Figure 4:
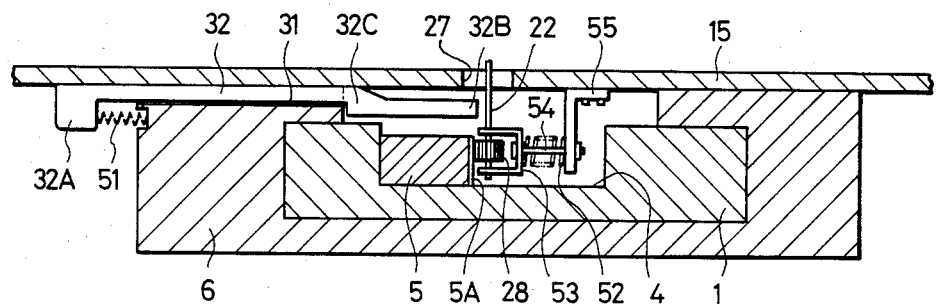
FIGS. 4 and 5 are enlarged sectional views showing the essential portions of a second and a third embodiments, respectively.

FIG. 4 shows the second embodiment. Referring to the drawing, a return spring 51 is confined between the control end 32A of the releasing pin 32 and the outer side surface of the slider 6, whereby the return spring 51 urges the releasing pin 32 to the right in the drawing. Furthermore, the releasing pin 32 is formed with a dislodgement locking portion 32C for abutting against the inner side surface of the slider 6. In a state where this dislodgement locking portion 32C abuts against the aforesaid inner side surface, the engageable end 32B is slightly spaced apart from the rotary shaft 22. Furthermore, the pinion 28 capable of being in mesh with the rack 5A is urged against the rack 5A by a biasing member 53 for urging the rotary shaft 22 toward the rack 5A through the resiliency of a compression coil spring 52 as being the biasing means abuttingly engaged with portions of the rotary shaft 22 at the top end's side and the bottom end's side of the driving pinion 28. This biasing member 53 is projectingly provided with a pin 54. The other end portion of this pin 54 is movably supported by the rear cover 15 through a retainer 55, and the compression coil spring 52 confined between the biasing member 53 and the retainer 55, surrounding the pin 54.

The second embodiment as described above is advantageous in that, since the push-in operation of the releasing pin 32 toward the rotary shaft 22 against the return spring 51 can release the pinion 28 from the rack 5A against the compression coil spring 52, the same effects as the first embodiment can be offered, and moreover, in bringing the driving pinion 28 and the rack 5A into meshing engagement with each other again after the correction of a shift in position of the needle 43, the engageable end 32B of the releasing pin 32 can be quickly released from the rotary shaft 22 through the resiliency of the return spring 51.

Figure 5:
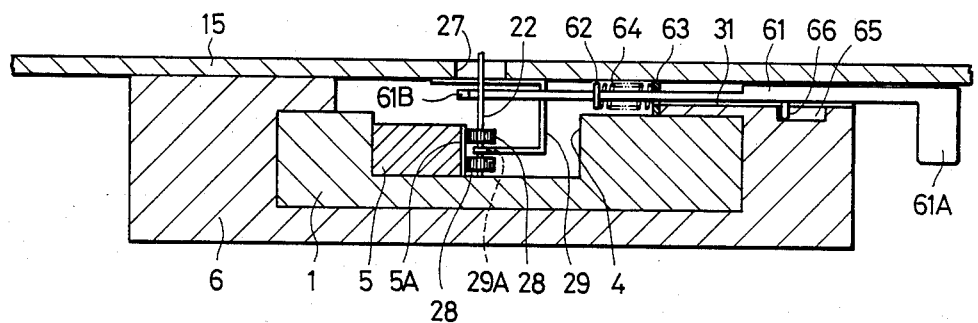

FIG. 5 shows the third embodiment. The releasing means in this third embodiment is a releasing pin 61. The forward end of this releasing pin 61 is formed into a U-shaped engageable end 61B, and, when the releasing pin 61 is moved to the right in FIG. 5, the U-shaped engageable end 61B is engaged with the rotary shaft 22 to tilt the rotary shaft 22 in the counterclockwise direction, so that the driving pinion 28 can be released from the rack 5A. Furthermore, a C-ring 62 is fixed to a predetermined position on the releasing pin 61, and a return spring 64 is confined between the C-ring 62 and the inner peripheral surface of the slider 6 through a seat plate 63, whereby the releasing pin 61 is biased to the left in the drawing. Furthermore, a moving range control groove 65 is formed on the bottom of the guide groove 31 within a predetermined range and a pin 66 for sliding in this groove 65 is projectingly provided at a predetermined position on the bottom end surface of the releasing pin 61, whereby the releasing pin 61 is restricted in its moving range by the groove 65 and the pin 66. This third embodiment is advantageous in that, since the outwardly pulling operation of the control end 61A of the releasing pin 61 can release the driving pinion 28 from the rack 5A, such a possibility is very low that the driving pinion 28 is carelessly released from the rack 5A.

In working, the rotary shaft 22 need not necessarily be supported by the dial indicating portion 11 through the tiltable bearing 21, but, the rotary shaft 22 may be supported by any other means in a manner to be tiltable, or, the rotary shaft 22 may be moved along with the bearing portion thereof without being tilted for example. Furthermore, the cantilever spring 29 and the compression coil spring 52 as being the biasing means have been directly or indirectly supported by the base plate 16, but, may be supported by any other portion of the dial indicating portion 11, or, may be supported by the slider 6. Further, the biasing means need not necessarily be limited to the cantilever spring 29 and the compression coil spring 52, or limited to the arrangement in which the biasing means is directly engaged with the rotary shaft 22 to bias the pinion 28, but, may be one biasing the bearing portion of the rotary shaft 22 for example.

Furthermore, the releasing pin 32 and 61 as being the releasing means need not necessarily be supported by the slider 6 through the guide groove 31, but, may be supported by the dial indicating portion 11, and further, the releasing means need not necessarily be limited to be the releasing pin 32 and 61, but, may be a cam, a link, a wire, a spring and the like. In short, any arrangement capable of releasing the driving pinion 28 from the rack 5A is adoptable.

Further, such an arrangement may be adopted that the needle 43 is directly mounted onto the rotary shaft 22 and the needle 43 is driven without the enlarged transmission through the driving pinion 28. Additionally, the groove 4 may not be provided on the main scale 1.

Furthermore, the application of the present invention need not necessarily be limited to the dial indication type slide calipers, but, may be applied to dial indication type measuring instruments of other types such as a dial indication type depth gauge.

As has been described hereinabove, the present invention can provide a dial indication type measuring instrument, in which a shift in position of the needle can be readily corrected.

What is claimed is:

1. A dial indication type measuring instrument comprising:
   a main body provided therein with a rack;
   a slider having a dial indicating portion and movably supported on said main body;
   biasing means for biasing a driving pinion for driving a needle in said dial indicating portion toward said rack to bring said driving pinion into meshing engagement with said rack; and
   releasing means for releasing said driving pinion from said rack against the biasing force of said biasing means and having a control end being disposed outwardly of said slider.

2. A dial indication type measuring instrument as set forth in claim 1, wherein a rotary shaft of said driving pinion is tiltably mounted to said dial indicating portion through a tiltable bearing.

3. A dial indication type measuring instrument as set forth in claim 2, wherein:
   said tiltable bearing comprises a bearing member fixed into a bearing hole formed in a base plate of said dial indicating portion, a substantially spherical tiltable body rotatably inserted into said bearing member and a spring member for holding said tiltable body in cooperation with said bearing member; and
   said rotary shaft of the driving pinion is inserted through and held in said tiltable body.

4. A dial indication type measuring instrument as set forth in claim 1, wherein said biasing means is a cantilever spring, a fixed end of which is fixed to the dial indicating portion and a free end of which is engaged with a rotary shaft of said driving pinion, for biasing said driving pinion to said rack.

5. A dial indication type measuring instrument as set forth in claim 1, wherein said biasing means comprises a compression coil spring confined between a biasing member engageable with said driving pinion and a retainer connected to said biasing member and supported by said dial indicating portion.

6. A dial indication type measuring instrument as set forth in claim 4, wherein said releasing means is a releasing pin movably held in a guide groove formed in said slider, for urging said rotary shaft against the biasing force of said cantilever spring.

7. A dial indication type measuring instrument as set forth in claim 6, wherein said releasing pin is mountable to and demountable from said guide groove.

8. A dial indication type measuring instrument as set forth in claim 6, wherein said releasing pin is undetachably provided in said guide groove.

9. A dial indication type measuring instrument comprising:
   a main body provided therein with a rack and extending in the longitudinal direction;
   a slider slidably coupled to said main body;
   a dial indicating portion mounted to said slider and having a needle and a graduated portion for indicating a movement value of said slider;
   biasing means for biasing a driving pinion for rotating said needle to come into meshing engagement with said rack;
   releasing means and tiltable bearing means for tilting a rotary shaft of said driving pinion against the biasing force of said biasing means to release the engagement with said rack and having a control end disposed outwardly of said slider; and
   gears fixed onto said rotary shaft of said driving pinion, for enlargingly transmitting a rotation value of said driving pinion to said needle.

10. A dial indication type measuring instrument as set forth in claim 9, wherein
    said tiltable bearing means comprises a bearing member provided on said dial indicating portion and a substantially spherical tiltable body rotatably supported by said bearing member and inserted therethrough and held therein with one end portion of the rotary shaft of said driving pinion.

11. A dial indication type measuring instrument as set forth in claim 9, wherein said biasing means is a cantilever spring for biasing said driving pinion toward said rack, said spring is fixed at one end thereof to a rear cover of said dial indicating portion and formed at the other end thereof with a V-groove, and said V-groove is engaged with the rotary shaft of said driving pinion.

12. A dial indication type measuring instrument as set forth in claim 11, wherein said releasing means is a releasing pin movably held in a guide groove formed in said slider, for urging said rotary shaft against the biasing force of said cantilever spring.

13. A dial indication type measuring instrument as set forth in claim 12, wherein said releasing pin is mountable to and demountable from said guide groove.

14. A dial indication type measuring instrument as set forth in claim 12, wherein said releasing pin is undetachably provided in said guide groove.

15. A dial indication type measuring instrument comprising:
    a main scale provided at one end thereof with jaws for the external measuring and the internal measuring of a workpiece and extending in the longitudinal direction;
    a rack provided in a groove formed on said main scale in the longitudinal direction thereof;
    a substantially C-shaped slider provided with jaws opposed to said jaws for the external measuring and the internal measuring and slidably coupled to said main scale;
    a dial indicating portion fixed to said slider and including a needle and a graduated portion for indicating a movement value of said slider;
    a rotary shaft provided at one end thereof with a driving pinion meshingly engageable with said rack and supported at the other end thereof by said dial indicating portion;
    two large diameter gears fixed to the intermediate portion of said rotary shaft of the driving pinion, enlargedly transmitting a rotation value of said pinion to a center pinion for said needle, connected to each other through a tensile spring in a manner to be rotatable relative to each other and having the configuration identical with each other;

a spring as being means for biasing said driving pinion to normally be meshingly engaged with said rack, mounted at one end thereof to said dial indicating portion and engaged at the other end thereof with said rotary shaft of said driving pinion; and a releasing pin for releasing said driving pinion from said rack against the biasing force of said biasing means, said releasing pin being movably extended in a groove formed in said slider, abutted at one end thereof against the rotary shaft of said driving pinion and exposed at the other end thereof to outside of said slider.

16. A dial indication type measuring instrument as set forth in claim 15, wherein the release of the meshing engagement between said driving pinion and said rack is effected such that, when the rotary shaft of said driving pinion is pushed by said releasing pin, the rotary shaft of said driving pinion is tilted to release the engagement.

* * * * *